F. G. JOHNSON.
Exercising-Machine.

No. 212,946. Patented Mar. 4, 1879.

WITNESSES:
Ernest E. Wehnar
E. G. Lund

INVENTOR:
Frank G. Johnson

UNITED STATES PATENT OFFICE.

FRANK G. JOHNSON, OF BROOKLYN, NEW YORK.

IMPROVEMENT IN EXERCISING-MACHINES.

Specification forming part of Letters Patent No. 212,946, dated March 4, 1879; application filed April 30, 1878.

*To all whom it may concern:*

Be it known that I, FRANK G. JOHNSON, of the city of Brooklyn, county of Kings, and State of New York, have invented a new and useful Exercising Apparatus; and I do hereby declare that the following is a full, clear, and exact description of the construction and operation of the same, reference being had to the accompanying drawings, making a part of this specification, in which—

Figure 1:
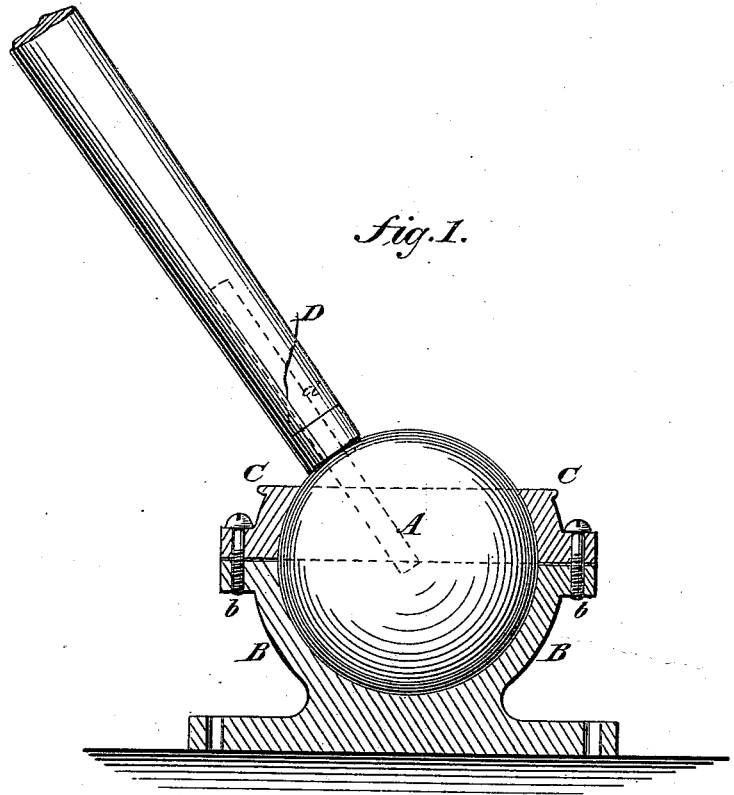
Figure 2:
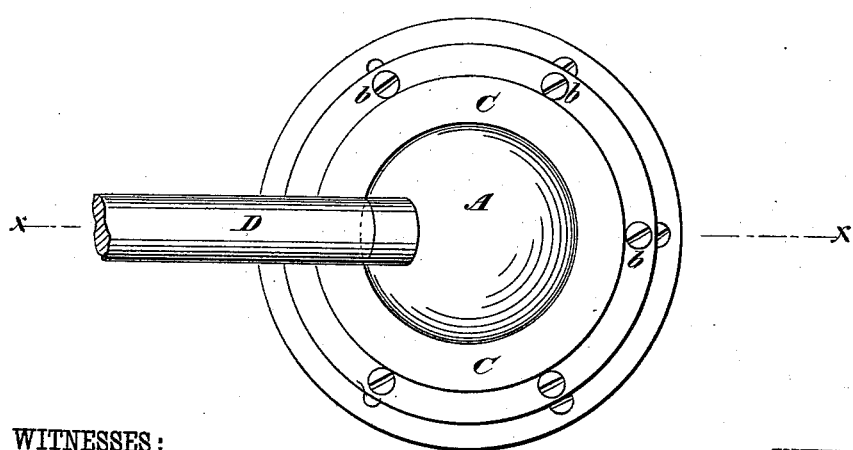

Figure 1 is a vertical section through the line $x\ x$, Fig. 2; and Fig. 2 is a view of the apparatus as seen when looking down upon it.

The object of my invention is to provide an apparatus for indoor physical exercise, and so arranged that with the same apparatus it can conveniently, and without time or expense, be adjusted to offer any desired amount of resistance to muscular action, so that a single instrument will answer for a whole family, which may be composed of persons of different degrees of strength as of men, women, and children.

The nature of my invention consists in the employment of adjustable friction as the element of resistance, which I accomplish by a suitable arrangement of surfaces between suitable woods or metals, and by means of a screw or screws. The amount of friction between the surfaces can be increased or diminished at pleasure.

Referring to the drawings, A represents a sphere, with a handle, D, about four feet and a half long. This sphere is fitted into a corresponding socket, which is to be bolted to the floor or base-board of the room, or upon a suitable board or platform. This socket is divided horizontally to introduce the sphere, and then the two parts of the socket B and C are united and held together by suitable screws $b\ b$.

The upper portion of the socket, to the extent of about two-fifths of the whole socket, is cut away to allow the introduction of the handle D, and to allow the lateral motion of the same.

The lower and upper portions, B and C, of the socket are fitted to the sphere in such a manner as to leave clamping-space between them. By means of this space and the clamping-screws $b\ b$, and the friction between the sphere and the two parts of the socket, any desired amount of friction can be produced.

The handle D can now be moved in any lateral direction and in any circular or curved line within the limits allowed by the opening in the upper part of the sphere above the line of the top C.

I am aware that there are various methods of constructing an adjustable friction joint or bearing which could be employed for carrying out the purposes of my invention. Therefore I do not circumscribe myself to the use of the particular method set forth; but

What I claim as my invention, and desire to secure by Letters Patent, is—

In an exercising-machine, the combination of an adjustable friction-joint composed of suitable moving surfaces, adjustable by screws, with appropriate handle, all constructed and arranged to be operated substantially in the manner and for the purpose set forth.

FRANK G. JOHNSON.

Witnesses:
E. G. LUND,
ERNEST E. MALMAR.